US006151098A

United States Patent [19]

Kayama

[11] Patent Number: 6,151,098

[45] Date of Patent: Nov. 21, 2000

[54] REPRINTING ORDER PROCESSING SYSTEM

[75] Inventor: Yasutaka Kayama, Wakayama, Japan

[73] Assignee: Noritsu Koki Co. Ltd., Wakayama-Ken, Japan

[21] Appl. No.: 09/305,557

[22] Filed: May 5, 1999

Related U.S. Application Data

[63] Continuation of application No. 08/889,213, Jul. 8, 1997, abandoned.

[30] Foreign Application Priority Data

Jul. 9, 1996 [JP] Japan .................................... 8-178976
Jul. 9, 1996 [JP] Japan .................................... 8-178977

[51] Int. Cl.[7] .......................... G03B 29/00; G03B 27/74; G03B 27/32

[52] U.S. Cl. ................................. 355/29; 355/68; 355/77

[58] Field of Search ................................ 355/38–43, 50, 355/75, 77, 29, 20, 27, 35, 68; 358/453, 502; 206/455, 459.5

[56] References Cited

U.S. PATENT DOCUMENTS

| | | | |
|---|---|---|---|
| 5,051,773 | 9/1991 | Davis | 355/40 |
| 5,179,409 | 1/1993 | Kazami et al. | 355/75 |
| 5,336,873 | 8/1994 | Imamura | 355/40 |
| 5,455,648 | 10/1995 | Kazami | 355/40 |
| 5,739,897 | 4/1998 | Frick et al. | 355/35 |
| 5,764,870 | 6/1998 | Manico et al. | 358/453 |
| 5,801,852 | 9/1998 | Truc et al. | 358/502 |

FOREIGN PATENT DOCUMENTS

| | | | |
|---|---|---|---|
| 5782332 | 11/1955 | Japan . | |
| 52-135721 | 11/1977 | Japan | G03B 27/00 |
| 56-42227 | 4/1981 | Japan | G03B 27/52 |
| 59-34291 | 8/1984 | Japan | G03B 27/46 |

OTHER PUBLICATIONS

Derwent Abstract of Japan Patent No. 59–000029.
Derwent Abstract of Japan of Patent No. 59–034291.
Patent Abstract of Japan Patent Application No. 59–028163.
Patent Abstract of Japan Patent Application No. 51–073683.
Patent Abstract of Japan Patent Application No. 51–027938.
Patent Abstract of Japan Patent Application No. 60–138469.
Patent Abstract of Japan Patent Application No. 06–264143.

*Primary Examiner*—D. Rutledge
*Attorney, Agent, or Firm*—Fulbright & Jaworski, LLP

[57] ABSTRACT

A system for processing a customers order for reprinting uses a plurality of film pieces cut from a film to obtain a predetermined number of frames and is based on reprint order information recorded in a recording medium. The reprint order information includes frame position data concerning the position of a target frame to be printed in association with a condition thereof, and is held in a film piece holder in which the plurality of film pieces are held in an end flush state and according to a predetermined arranging order and print number data concerning the total number of reprints to be obtained from the target frame. Based on this frame position data, one film piece containing the target frame from the plurality of film pieces is determined and the position of the target frame within the specified film piece is also determined.

3 Claims, 4 Drawing Sheets

REPRINTING ORDER PROCESSING SYSTEM

This application is a continuation of U.S. Ser. No. 08/889,213 filed Jul. 8, 1997 abandoned.

BACKGROUND OF THE INVENTION

1. Field of the Invention

The present invention relates to the art of processing a reprint order from a customer based on reprint order information, using a plurality of film pieces cut from a film to contain predetermined numbers of frames.

2. Description of the Related Art

At a camera shop, when a shop attendant receives a customer's order for reprint, he/she keeps a foldable film piece holder storing a plurality of film pieces and writes in an order slip the serial number(s) of frame(s) to be reprinted and also the total number of reprints (copies) to be produced therefrom. Thereafter, an operator of a photographic printer checks the order slip and selects and takes out , from the film piece holder, a film piece(s) which contains the specified frame(s) and then sets the piece to the printer for obtaining reprint(s) of the image of the frame.

The convention has proposed some measures for automating the above manual reprint order procedures. For instance, according to Japanese published patent gazette Sho. 59-92, in an unfolded state of the foldable film piece holder holding a plurality of film pieces according to a predetermined order, a serial frame number of a frame located at the right end of the first uppermost film piece is recorded, so that the film pieces to which the other frames belong and their positions in these respective pieces may be specified with reference to the recorded serial frame number of the right-end frame in the first piece. This art is based on the assumption that the other film pieces than the first one all contain a same predetermined number of frames. As a matter of fact, when the film pieces are obtained by cutting of a film, the lengths of the last two pieces are adjusted so as to allow the last piece to contain at least two frames. This is because a film piece containing only one frame will be too short to be processed properly by the printer. As a result, it sometimes happens that the last two film pieces have fewer frames than the predetermined number. In such case, the above-described method cannot achieve its object of specifying the position of frame(s).

Japanese published patent gazette Sho. 59-34291 attended to the above problem and proposed a different method. In this method, in addition to the serial frame number of the right-end frame in the uppermost film piece, the respective total numbers of the frames contained in the last two film pieces are also recorded. With this, even when the last two film pieces have fewer frames than the predetermined number of frames, the other film pieces containing the other frames and the positions of these frames within the respective pieces may be specified.

According to either of the above-described conventional methods, in order to specify the film piece containing the target frame designated in the order slip and the position of the frame within the particular film piece, an operator must visually check the serial frame number of the frame in the specified film piece. However, such visual checking is very difficult, especially when the film piece is held within a semi-transparent film pocket of the film holder. Then, for checking the number, the operator must takes the trouble of drawing the film piece out of the holder, but even then the visual checking of the frame number is still difficult as this number is printed too small.

SUMMARY OF THE INVENTION

In view of the above-described state of the art, in the art of specifying a position of a target frame to be printed in a plurality of film pieces as held in a film holder means according to a predetermined order of cutting for obtaining these film pieces from a film to contain predetermined number of frames, a primary object of the present invention is to provide a reprint order processing system which can eliminate the necessities of inputting and visual checking of the serial frame number of the frame.

For accomplishing the above-noted object, in a system according to the present invention for processing the customer's order for reprinting based on reprint order information recorded in a recording medium with using the film pieces which are cut from a film to obtain predetermined number of frames and which are held in a film holder means, the reprint order information includes frame position data concerning the position of a target frame to be printed in association with a condition thereof held in the film holder means in which the plurality of film pieces are held in an end flush state and according to a predetermined arranging order and print number data concerning the total number of reprints to be obtained from the target frame; and the system specifies one film piece containing the target frame as well as the position of the target frame within the specified film piece based on the frame position data.

According to the above-described reprinting order processing system of the present invention, a target frame whose reprinting is requested by a customer is designated in relation with the position data of the frames of the film pieces as held in an end flush condition and according to a predetermined arranging order and then this data is recorded in the recording medium such as an order slip. Thereafter, at the time of printing using a photographic printer, the film piece containing the target frame and the position of the target film in this film piece are specified, based on the recorded frame position data. That is, the frames of all of the film pieces are considered as 'elements' of a two-dimensional matrix which is comprised of the two-dimensional arrangement of the film pieces on the film holder in its unfolded state. Then, by representing the position of the target frame as an element in this matrix, this target frame may be specified at the time of order and at the time of the subsequent printing operation as well. With this method, the serial frame number is not needed at all at the time of order or printing. As a result, the system has eliminated the necessity of checking of the serial frame number which used to be a major cause of error in specifying a frame in processing of reprinting order.

According to one preferred embodiment of the present invention the recording medium recording therein the reprint order information including the frame position data and the print number data is adapted to be held, together with the film pieces, in the film piece holder means. With this, it is possible to avoid inconvenience of the recording medium and the film pieces being accidentally separated from each other. Moreover, the series of operations for reading the reprint order information from the recording medium and taking out a necessary film piece from the holder may be effected by a same handling device. According to a further preferred embodiment proposed for achieving this purpose, the recording medium is provided in the form of a recording sheet having dimensions similar to those of the film piece. The specific method of recording the data in the recording sheet may be any of various known recording methods such as a mark-sheet recording method or magnetic recording method.

In any case, the above-described frame specifying method according to the present invention requires a reader device for reading the reprint order information from the recording medium such as the recording sheet. For this purpose, it is possible to utilize an optical or magnetic reader device incorporated within the photographic printer for its original purpose of monitoring a frame image. In this respect, according to a further preferred embodiment of the present invention, the reader device reads the reprint order information when the recording sheet after being drawn out of the film piece holder means is returned into this holder means. In general, a holding pocket of such film piece holder means is provided with some excess width-wise space for allowing smooth insertion and withdrawal of the film piece, but this excess space makes it difficult to accurately control the position of the recording medium during the step of drawing it out of the pocket, which control is essential for reliable data reading operation. Therefore, before the data reading operation can be started, the recording medium must first be withdrawn completely from the holder and then positioned accurately at a predetermined position for data reading operation. On the other hand, according to the above-described method of the invention, the data reading operation may be effected simultaneously with the step of returning the recording sheet back into the film piece holder means during which step the recording sheet has already been restricted in its position. As a result, the efficiency of the entire process may be improved.

According to a still further preferred embodiment of the invention, the target frame is represented as an element of a matrix including the positions of the film pieces and the positions of the frames in the respective film pieces as row numbers and column numbers respectively. Further, the print number data is represented as an attribute value of the matrix element. That is to say, the print number, i.e. the total number of prints to be obtained, is represented as a value provided for the element of the matrix including the positions of the respective film pieces as held in the film piece holder and the positions of the frames in the respective film pieces. In other words, according to the above method, the entire reprint order information can be represented as a 'list' consisting of not more than three numerals representing the row number, the column number and the print number, respectively. Thus, the data processing load to which the system is subjected may be advantageously reduced.

Further and other objects, features and effects of the present invention will become more apparent from the following more detailed description of the embodiments with reference to the accompanying drawings.

DESCRIPTION OF THE PREFERRED EMBODIMENTS

Figure 1:
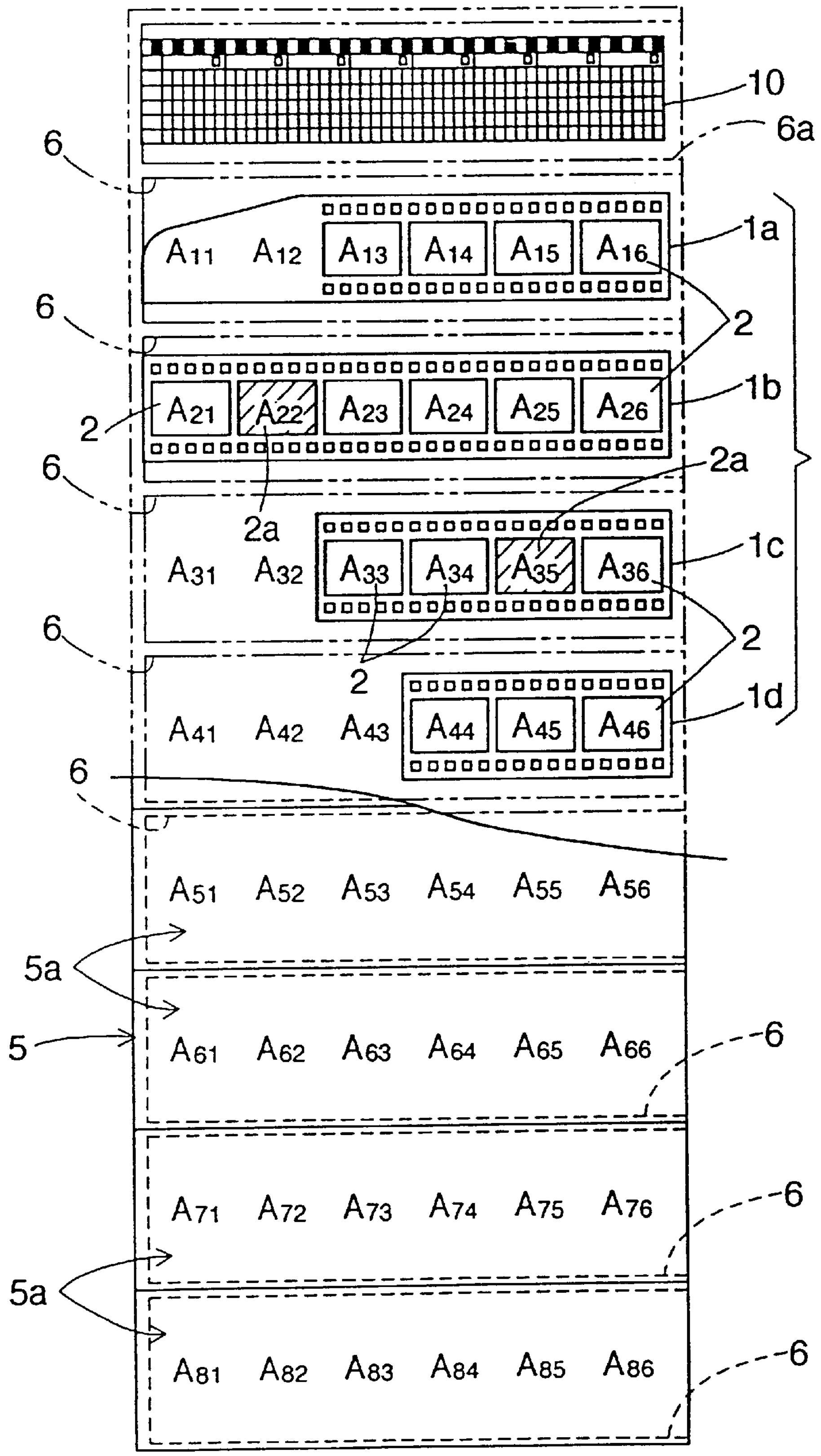
FIG. 1 is a descriptive view showing a recording sheet and film pieces held in respective holder pockets of a film piece holder.
Figure 2:
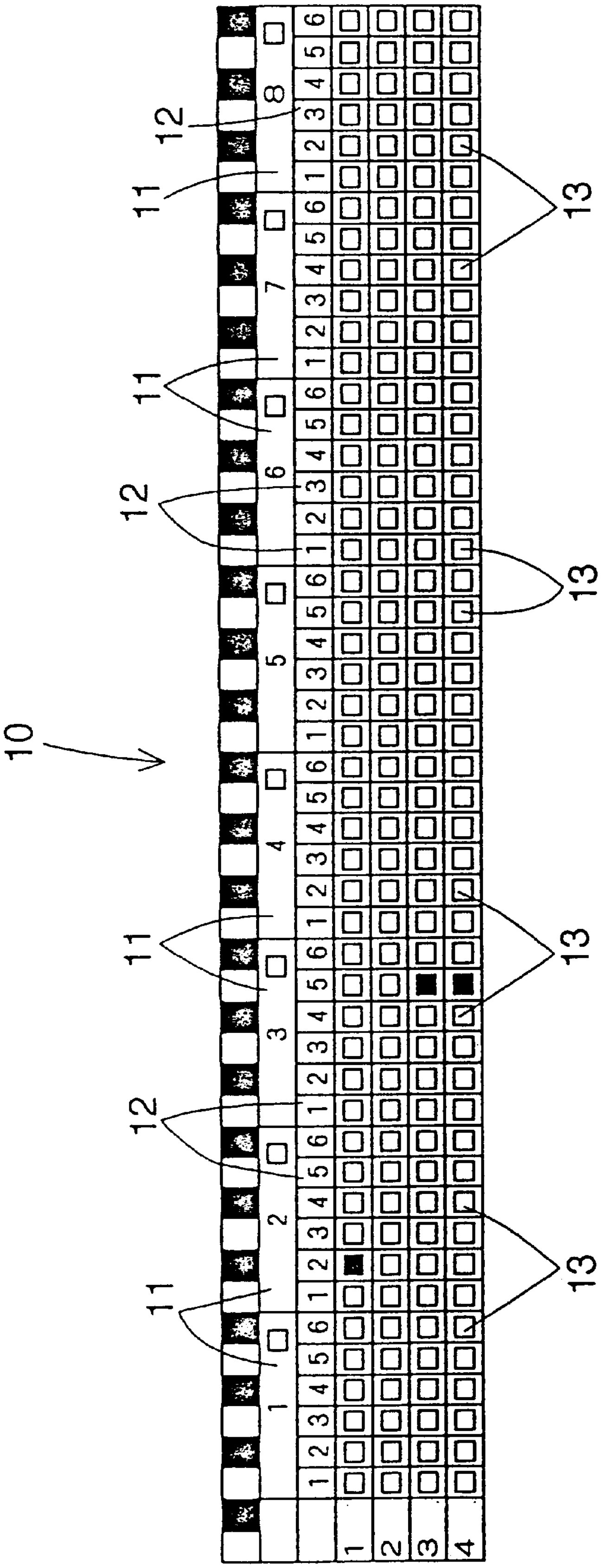
FIG. 2 is a plan view of the recording sheet.

At a camera shop, when a shop attendant receives a reprinting (copying) order from a customer, he/she keeps from the customer a film piece holder 5 storing therein a plurality of film pieces 1, as shown in FIG. 1, when the attendant also keeps a recording sheet 10 shown in FIG. 2 recording therein the frame(s) to be reprinted and the total number of reprints (copies) to be made therefrom. Alternatively, the attendant will have the customer write these data into an order slip. The film piece holder 5 is the well-known type including a plurality (total eight, in the illustrated example) of elongate film pockets 6 each holding therein a film piece. The film pockets 6 are arranged one above another on the unfolded surface of the holder. That is, this holder 5 may be folded along border lines delimiting adjacent pockets. This holder 5 further includes, in the uppermost row, an additional pocket 6*a* for holding the recording sheet 10. For this purpose, it is preferred that the recording sheet 10 be sized similarly to the film piece 1. The film holder 5 is transparent or semitransparent at least in its surface 5*a* so as to allow viewing of the frames 2 of the film pieces 1 held therein from the outside. Each pocket 6 has a length adapted for storing one film piece 1 containing total six frames. These film pieces 1 are obtained by cutting a single film into the number of pieces to a length of 6 frames in general In this cutting, if the last cut piece has only one frame, such short piece may cause a problem in the printing process. Therefore, in order to allow the last film piece to contain at least two frames 2, the length of this last piece is adjusted by e.g. adjusting the length of the second to last film piece so that this piece may contain fewer than 6 frames in total. On the other hand, in the sample illustrated in FIG. 1, the first film piece 1*a* has the full length corresponding to 6 frames, but contains fewer frames, since the first frame 2 is formed with a predetermined distance from the starting end of the film, due to the mechanical requirement or limitation of the camera employed. As a result, this first film piece contains only four frames in total. The second and third film pieces 1*b* contains the full number of frames, i.e. total six frames. The second to last film piece 1*c* has a shorter length and contains only four frames 2 for the above-described purpose of the length adjustment of the last film piece 1*e*; and accordingly this last film piece 1*e* contains total three frames 2.

Now, the respective frames 2 of the film pieces 1 held side-flush with the opening end (right end in FIG. 1) of the film pockets 6 may be considered as elements of a (4, 6) matrix having the positions of the film pieces 1 as rows and the positions of the frames 2 in the respective film pieces 1 as columns. For instance, the right-end frame 2 in the first film piece 1*a* may be represented as an element having a row number 1 and a column number 6.

As shown in FIG. 2, the recording sheet 10 includes a film piece number area 11 for identifying the position of each film piece 1 relative to the other film pieces 1 all held in the same holder 5, a frame number area 12 for identifying the position of each frame 2 relative to the other frames 2 within the same respective film piece 1, and a print number area 13 in which the total number of prints to be obtained from a target frame designated by the customer is entered in the well-known mark sheet recording method. In the case of a sample marking illustrated in FIG. 2 it may be seen that this customer ordered one copy of the frame 2 located second from the right end frame of the second film piece 1*b* and seven copies of the further frame 2 located fifth from the right end frame of the third film piece 1*c*. Then, if all of the frames of the film pieces 1 which can be held in the holder 5 are expressed in the (8, 6) matrix: A described hereinbefore, the two target frames 2*a* are designated as Element A22 and Element A35, respectively. Also, Element A22 is provided with the value '1' and Element 35 the value '7', respectively. Then, this particular reprint order can now be expressed in the list representations: (2, 2, 1) and (3, 5, 7).

Figure 3:
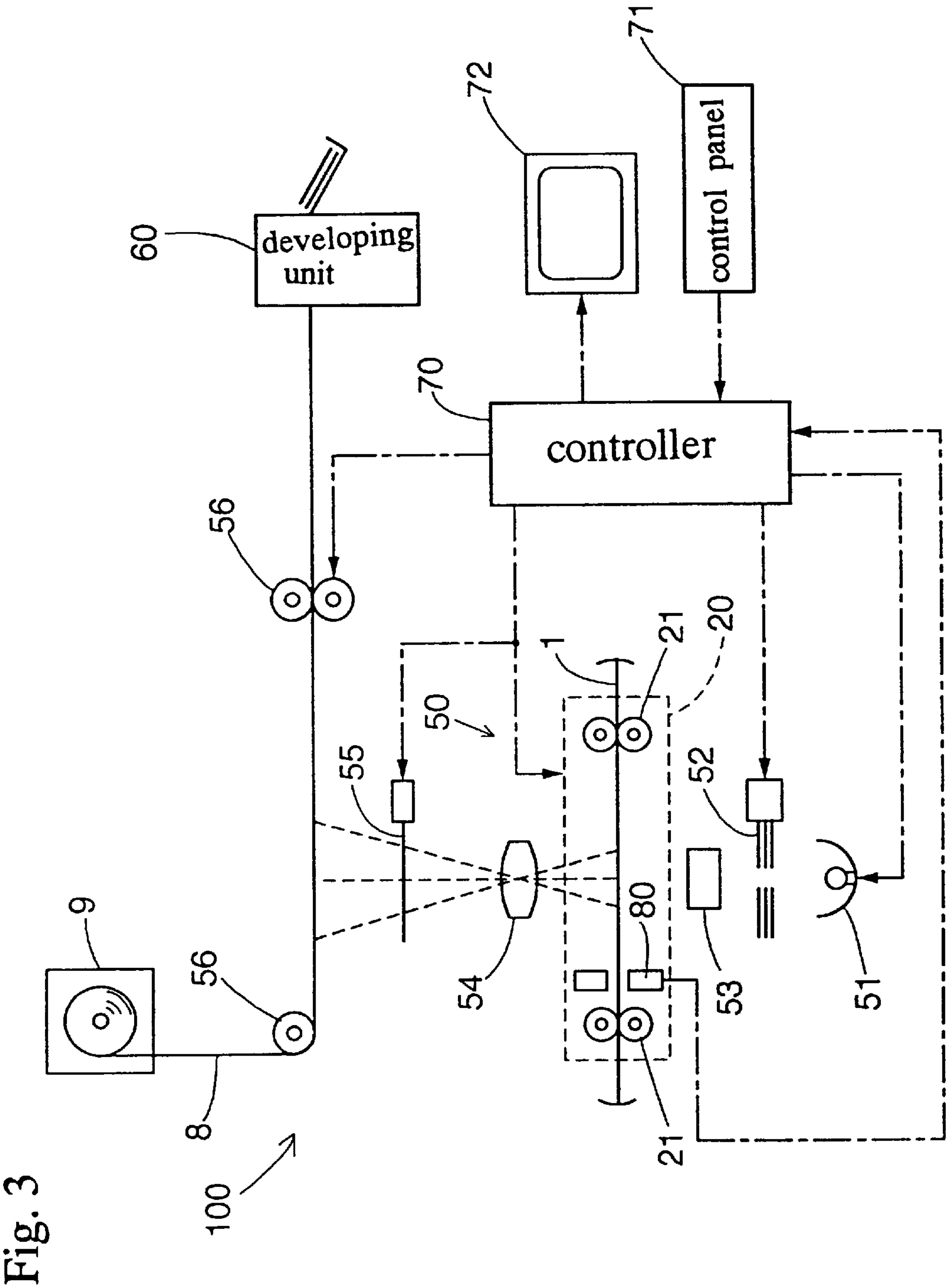
FIG. 3 is a block diagram of a printing system to be used by the present invention.

FIG. 3 is a block diagram of a photographic printer 100 for use in the reprint order processing system according to the present invention. This photographic printer 100 includes an exposing section 100 for exposing an image of each frame 2 of the film piece 1 onto a print paper 8, a developing section 60 for developing the exposed print paper 8, and a controller 70 for controlling the respective sections. The controller 70 is connected with a control panel for allowing inputs of various commands to the printer and a monitor 72 for displaying the image of the frame 2 read by a scanner 80. When the film piece 1 to be printed is conveyed to the exposing section 50 by a film conveyer unit 20 to be detailed later, the image of the target frame 2*a* contained in the film piece 1 is read and this image information is transmitted to the controller 70. Then, based on this image information read from the frame 2, the controller 70 determines exposure conditions and causes the monitor 72 to display a simulated image which will be obtained if the image information is exposed on to the print paper 8 under the determined exposure conditions. The exposing section 50 includes an exposing light source 51, a light modulating filter 52 for adjusting balance of color components of the light irradiated from the light source 51 by projecting or retracting respective filters having yellow, magenta and cyan colors into or from an exposing light path, a mirror tunnel 53 for uniformly mixing the light color components balance-adjusted by the light modulating filter 52, and a printing lens 54 for focusing the image of the frame 2*a* on the print paper 8, a shutter 55, and conveyer rollers 56 for conveying the print paper 8. Based on the exposure conditions determined by the controller 70, the positions of the respective color filters of the light modulating filter 52, the opening period of the shutter 55, i.e. the exposure period are controlled. By observing the display on the monitor 72, if the displayed simulation image is not appropriate, then, an operator of this photographic printer 100 can input to the controller 70 via the control panel 71 an instruction for correcting the exposure conditions, so that the controller 70 determines new corrected exposure conditions according to the correction instruction. Then, based on these finally determined exposure conditions, the operations of the respective components of the exposing section 50 are controlled to expose the image of the target frame 2*a* of the film piece 1 on the print paper 8 withdrawn from a print paper magazine 8.

Figure 4:
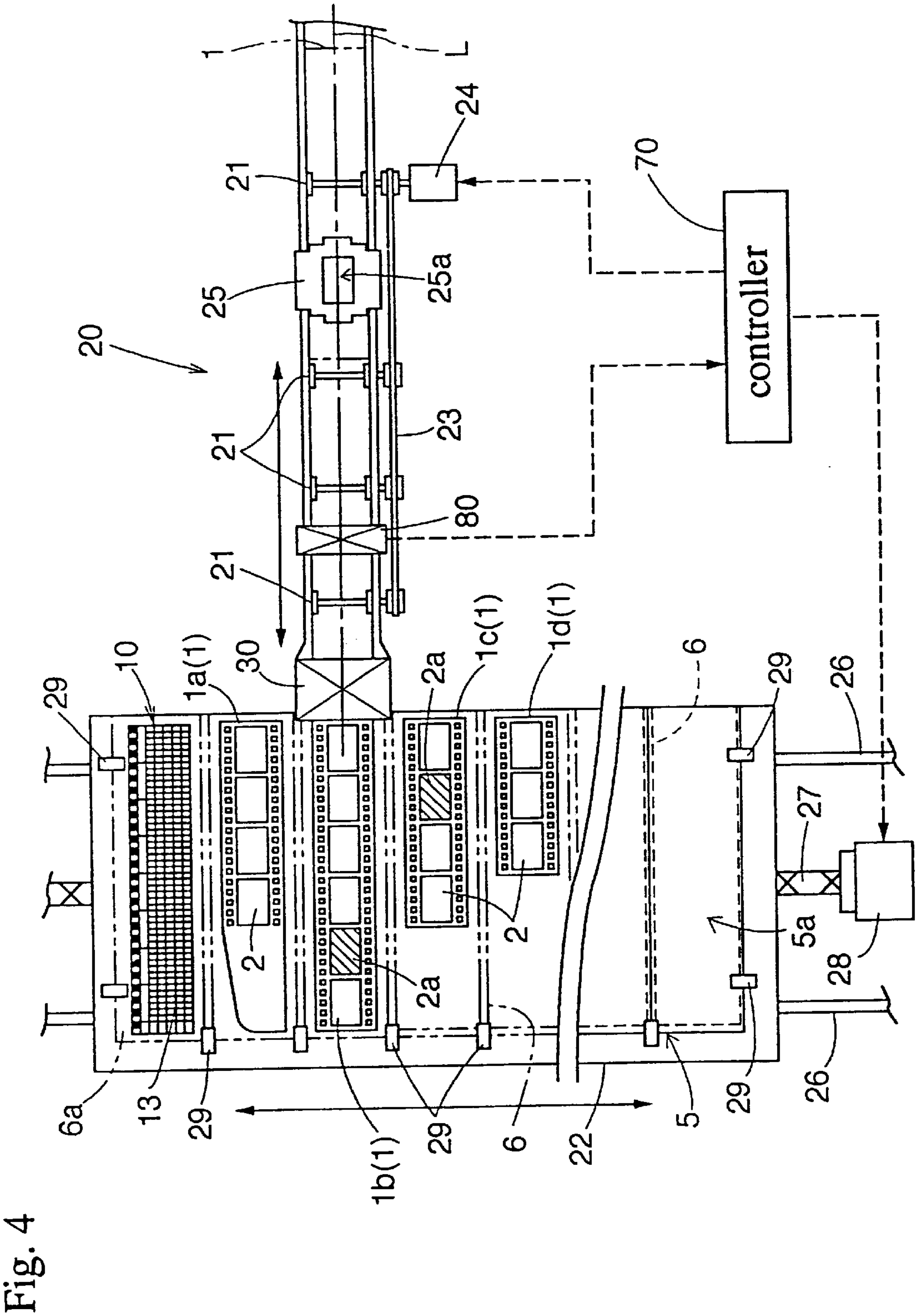
FIG. 4 is a block diagram of a film conveying unit.

Next, with reference to a block diagram of FIG. 4, there will be described the construction of the film conveyer unit 20 for drawing the film piece 1 out of the film piece holder 5, conveying the piece 1 to the exposing section 50 and fixing it in position and then returning the piece 1 after the exposure back into the film holder 5. The film conveyer unit 20 includes a plurality of drive rollers 21 forming a film conveying line L within the exposing section 50 and a film piece carrier 22 for fixedly positioning the film piece holder 5 holding the recording sheet 10 and the film pieces 1 therein relative to the film conveying line L. The drive rollers 21 are driven via a belt 23 by a roller driving motor 24. Incidentally, the film piece 1 is conveyed back and forth as being pinched between the drive roller 21 and an unillustrated pinch roller. On the film conveying line L, there is disposed a film mask 52, which defines an aperture 25*a* for regulating an area on the print paper 8 on which the image of the target frame is to be exposed. The film piece carrier 22 can be moved back and forth in a direction transverse to the film conveying line L by the function of a feeder screw 27 while the carrier 22 is being guided by guide rods 26. The feeder screw 27 is rotated forwardly or reversely by a feeder screw drive motor 28. About a mounting face of the film piece holder carrier 22, there are disposed clamps 29 for fixing the recording sheet 10 or film piece 1 in position. Numeral 30 denotes a transfer device for transferring the recording sheet 10 or the film piece 1 between the drive rollers 21 and the film piece holder carrier 22. This transfer device 30 functions to draw the recording sheet 10 or film piece 1 out of the film piece holder 5 and feeds it to the drive rollers 21 or functions reversely to transfer the sheet or piece from the rollers back into the holder. The construction of this transfer device 30 per se is known, as a device for automatically packing the film piece 1 into the film piece holder 5. Therefore, detailed description of this device will be avoided.

The roller drive motor 24, the feeder screw drive motor 28 and the transfer device 30 are all controlled by the controller 70.

Next, the reprint order processing procedure using the photographic printer having the above-described construction will be described. First, the film piece holder 5 holding the recording sheet 10 and the film pieces 1 is fixedly set at a predetermined position on the film piece holder carrier 22. The recording sheet 10 stores the reprint order information including the position of the target frame 2*a* to be reprinted and the number of reprints to be obtained therefrom. Then, the carrier 22 is moved so as to bring the recording sheet 10 in registry with the film conveying line L for allowing reading of the reprint order information. Namely, the transfer device 30 then draws the recording sheet 10 from the film piece carrier 22 and transfers this sheet 10 to the drive rollers 21, by which the sheet 10 is conveyed along the film conveying line L to the right side in FIG. 4. When the rear end of the recording sheet 10 passes a scanner 80, the drive rollers 21 are reversely rotated to convey the sheet 10 back toward the film piece holder 5 (to the left side in FIG. 4). And, in the course of reverse conveying process, the scanner 80 scans the print number area 13 (in which the data are entered in the mark sheet method) and then transmits to the controller 70 the data concerning the positions of the frames to be printed and the total number of copies obtained therefrom. The film conveying line L formed by the drive rollers 21 disposed in series includes side guides in the form of grooves. Therefore, once the recording sheet 10 enters this film conveying line L, the recording sheet 10 is accurately guided sidewise to be suitable for reliable data reading operation by the scanner.

If the scanned recording sheet 10 is as illustrate in FIG. 2, the controller 70 recognizes that one copy is to be obtained for the fame 2 of row 2 and column 2, i.e. the frame located fifth from the right end frame of the second film piece 1*b* and seven copies are to be obtained from the frame 2 of row 3 and column 5, i.e. the frame located second from the right end frame of the third film piece 1*c*. That is, the controller 70 stores a program for generating a matrix representing the frame positions based on the information obtained from the recording sheet 10 and then controlling the film conveyer unit 20 to guide each of the target frames 2*a* to the exposing position.

Accordingly, first, the film holder carrier 22 is moved to bring the second film piece 1*b* into registry with the film conveying line L, and the film piece is drawn out of the film holder 5 by the transfer device 30 and then conveyed further by the drive rollers 21. In the course of this conveying operation, the scanner 80 scans the frames 2. Using these scanned frame data, the controller 70 controls the drive motor 24 to bring the frame 2 located at the fifth position from the right end of the film piece to the position of the aperture 25*a* of the film mask 25, i.e. the exposing position.

In specifying the target frame 2*a*, since it is assumed that the respectively film pieces 1 all have six frames and also the frame positions are represented in the matrix under the right-flush condition of the film pieces 1 as illustrated in FIG. 1, then, the position of the frame from the right end can be determined by subtracting its column number from '7'. When the target frame 2*a* is set at the exposing position, the exposing section 50 exposes the image of this target frame 2*a* on to the print paper 8. After this exposure, the film piece 1*b* is returned into the same pocket 6 of the film holder 5.

Similarly, the third film piece Id is drawn out of the film holder 5 and the image of the other target frame 2*a* located at the second position from the right end is exposed on to the print paper 8. In this case, the same image is exposed on the print paper 8 for seven times, to produce seven copies of this image.

According to the reprint order processing system described above, the specification of the target frame 2 to be printed does not use its serial frame number, and uses instead the matrix position of the frame 2 per se. Therefore, this system allows easier and more direct specification of a frame and can avoid an error in reading the serial frame number which is usually not readily readable.

[modified embodiments]

In the foregoing embodiment, for specifying the target frame 2*a*, the position in the (8, 6) matrix is employed. Needless to say, depending on the 25 particular manner of cutting of the film pieces 1 and the particular holding arrangement of the film piece holder 5, any other matrix including different numbers of rows and/or columns may be employed.

Further, the method of recording the reprint order information in the recording sheet 10 is not limited to the mark sheet type described 30 hereinbefore. Instead, any other method such as the magnetic card method, bar code method, or punched card method may be employed Further, in the foregoing embodiment, for reading the data from the recording sheet, the scanner originally equipped to the photographic printer system is employed. Instead, another scanner dedicated for the data reading purpose may be provided separately.

What is claimed is:

1. A system for processing a customer's order for reprinting in use with a plurality of film pieces which are cut from a film to obtain predetermined number of frames, said system comprising:

film piece holder means having a plurality of film pockets arranged in a row, the film pockets holding the plurality of film pieces according to a predetermined arranging order;

a recording medium sized similarly to one film piece, one of the film pockets holding the recording medium;

reprint order information recorded in the recording medium, the reprint order information including frame position data concerning the position of a target frame to be printed in the film piece holder means, and print number data concerning the total number of reprints to be obtained from the target frame;

a film conveyor unit for drawing one film piece containing the target frame out of another one of the film pockets and transferring this film piece along a film conveying line to an exposing unit;

a reader device for reading the reprint order information from the recording medium, the reader device being provided on the film conveying line, wherein the recording medium is drawn out of said one of the film pockets and transferred to the film conveyor unit so that the reader device can read the reprint order information from the recording medium; and a controller for specifying one film piece containing the target frame from the plurality of film pieces and determining the position of the target frame within the specified film piece based on the read reprint order information.

2. A system according to claim 1, wherein the frame position data in the reprint order information is recorded as elements of a matrix in which the position of the film pocket holding the film piece of the target frame to be printed represents a row, and the position of the target frame within this film piece represents a column.

3. A system according to claim 2, wherein the print number in the reprint order information is recorded as an attribute value of the matrix element representing the target fame.

* * * * *

UNITED STATES PATENT AND TRADEMARK OFFICE

CERTIFICATE OF CORRECTION

PATENT NO. : 6,151,098

DATED : November 21, 2000

INVENTOR(S) : Yasutaka Kayama

It is certified that error appears in the above-identified patent and that said Letters Patent is hereby corrected as shown below:

In column 7, line 11, change "Id" to - - 1d - -.
In column 7, line 28, delete - - 25 - -.
In column 7, line 34, delete - - 30 - -.

Signed and Sealed this

First Day of May, 2001

Attest:

NICHOLAS P. GODICI

Attesting Officer

*Acting Director of the United States Patent and Trademark Office*